(12) United States Patent
Kang

(10) Patent No.: US 8,986,873 B2
(45) Date of Patent: Mar. 24, 2015

(54) BATTERY PACK

(75) Inventor: Dong-Wan Kang, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 140 days.

(21) Appl. No.: 13/341,090

(22) Filed: Dec. 30, 2011

(65) Prior Publication Data

US 2012/0251870 A1    Oct. 4, 2012

(30) Foreign Application Priority Data

Apr. 1, 2011 (KR) .................. 10-2011-0030243

(51) Int. Cl.
*H01M 2/24* (2006.01)
*H01M 2/10* (2006.01)
*H01M 2/20* (2006.01)

(52) U.S. Cl.
CPC .............. *H01M 2/105* (2013.01); *H01M 2/204* (2013.01)
USPC ............................ 429/158; 429/160; 439/627

(58) Field of Classification Search
None
See application file for complete search history.

(56) References Cited

U.S. PATENT DOCUMENTS

| 4,542,082 | A * | 9/1985 | Rowlette .................. 429/210 |
| 7,642,746 | B2 * | 1/2010 | Kim et al. .................. 320/112 |
| 8,287,313 | B2 | 10/2012 | Kwon et al. |
| 2007/0126394 | A1 | 6/2007 | Kim et al. |
| 2011/0008667 | A1 | 1/2011 | Kwag et al. |
| 2011/0086255 | A1 | 4/2011 | Maxwell et al. |

FOREIGN PATENT DOCUMENTS

| JP | 2003-297333 | 10/2003 |
| JP | 2003-317679 | 11/2003 |
| JP | 2006-100146 | 4/2006 |
| JP | 2009070614 | 4/2009 |
| KR | 0889243 B | 3/2009 |
| KR | 10-2010-0000888 | 1/2010 |
| KR | 10-2011-0005168 | 1/2011 |

OTHER PUBLICATIONS

Korean Office Action issued by KIPO on Sep. 26, 2012 in corresponding Korean Patent Application No. 10-2011-0030243.
Korean Notice of Allowance issued by KIPO on Jan. 30, 2013 in corresponding Korean Patent Application No. 10-2011-0030243.

* cited by examiner

*Primary Examiner* — Milton I Cano
*Assistant Examiner* — Carmen Lyles-Irving
(74) *Attorney, Agent, or Firm* — Robert E. Bushnell, Esq.

(57) ABSTRACT

A battery pack includes at least two or more bare cells, a lead tab and an insulating member. Each of the bare cells has a first terminal portion. The lead tab is provided to the first terminal portion of the bare cell. The insulating member is interposed between the bare cell and the lead tab and is provided with an opening so that the bare cell and the lead tab are electrically connected to each other. In the battery pack, the insulating member includes two or more bare cell facing portions respectively corresponding to the bare cells, an extending portion that connects neighboring bare cell facing portions to each other, and guide portions respectively provided to the bare cell facing portions so as not to be arranged in one straight line.

11 Claims, 5 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 1 Apr. 2011 and there duly assigned Serial No. 10-2011-0030243.

BACKGROUND OF THE INVENTION

1. Field of the Invention

An aspect of the present invention relates to a battery pack, and more particularly, to a battery pack configured including a plurality of bare cells.

2. Description of the Related Art

Recently, because of the rapid development of electronic, communication and computer industries, demand on large-capacity power sources capable of generating electric power has gradually increased in the consumer market.

A plan for increasing the size of a bare cell itself and a plan for configuring a battery pack using a plurality of bare cells are generally used as the plan for increasing the capacity of power sources. Since the plan for increasing the size of the bare cell has a limitation in generating electric power, various studies have been conducted to configure a battery pack using a plurality of bare cells and to improve the performance of the battery pack.

SUMMARY OF THE INVENTION

Embodiments of the present invention provide a battery pack capable of enhancing productivity by improving the workability of the battery pack.

Embodiments of the present invention also provide a battery pack capable of improving stability by decreasing the rate of failures that may occur in processes of the battery pack.

According to an aspect of the present invention, there is provided a battery pack including at least two or more bare cells each having a first terminal portion; a lead tab provided to the first terminal portion of the bare cells; and an insulating member interposed between the bare cell and the lead tab and provided with an opening so that each bare cell and the lead tab are electrically connected to each other, wherein the insulating member comprises two or more bare cell facing portions respectively corresponding to the bare cells, an extending portion that connects neighboring bare cell facing portions to each other, and guide portions respectively provided to the bare cell facing portions so as not to be arranged in one straight line.

The insulating member may be formed in a single body.

The extending portion may further include a first perforated line provided between neighboring bare cells.

The first perforated line may be provided at the center of the extending portion.

The opening may be provided at a central portion of the bare cell facing portion.

The lead tab may include a joint portion electrically connected to the bare cell, and a connection portion extended in a line shape from the joint portion.

The guide portion may be formed in a shape corresponding to the connection portion of the lead tab so as to be interposed between the connection portion and the bare cell.

The guide portion may be provided to be bent to a side surface of the bare cell.

The guide portions may be bent so as not to be overlapped with each other and bent perpendicular to the bare cell facing portion.

A second perforated line may be provided at a portion at which the guide portion is bent.

The bare cell may have a cylindrical shape, and the bare cell facing portion may be formed in a circular shape.

The first terminal portion of the bare cell may include a cap assembly, and an opening corresponding to the cap assembly may be provided to the bare cell facing portion.

The bare cell facing portion may include first to third bare cell facing portions in sequence, and the first to third bare cell facing portions may be provided to be connected in a 'ㄱ' shape.

First and third guide portions may be provided to the first and third bare cell portions, respectively, and the second bare cell facing portion may include one or more second guide portions provided so as not to be overlapped with each other.

The number of the second guide portions may be two or more, and the second guide portions may be bent perpendicular to the second bare cell facing portion. The bent second guide portions may be provided so that their corner portions come in contact with each other.

The insulating member may further include an adhesive layer.

The adhesive layer may be provided between the insulating member and the bare cells.

The insulating member may include a double-faced tape or Nomex tape.

As described above, according to embodiments of the present invention, it is possible to provide a battery pack capable of enhancing productivity by improving the workability of the battery pack.

Also, it is possible to provide a battery pack capable of improving stability by decreasing the rate of failures that may occur in processes of the battery pack.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
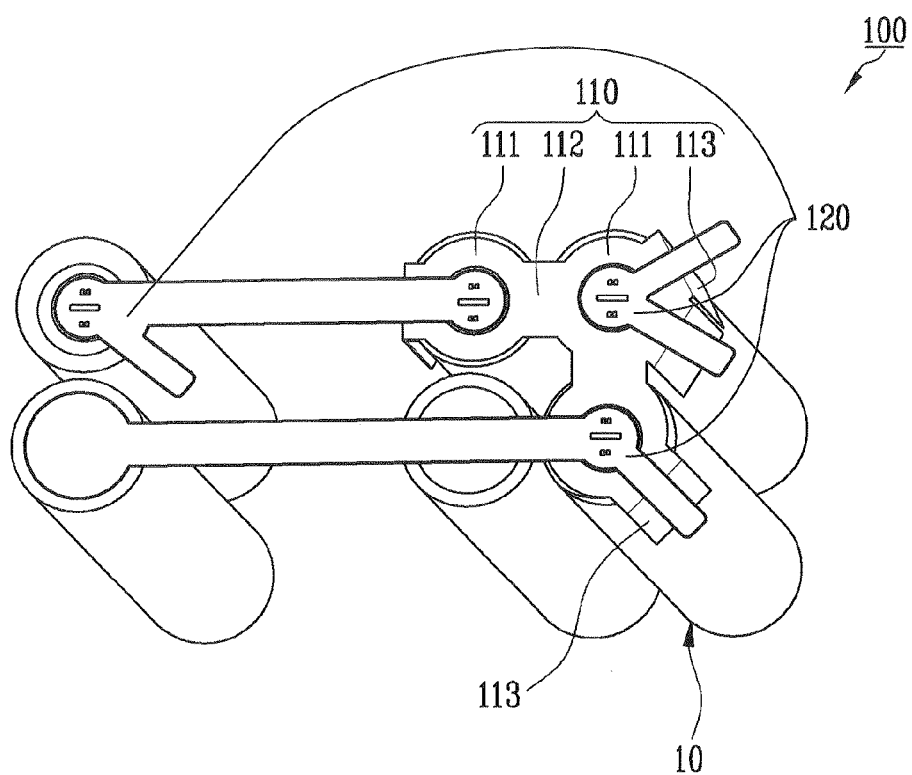
FIG. 1 is an oblique view of a battery pack constructed with an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be described in detail with reference to the accompanying drawings.

Figure 2:
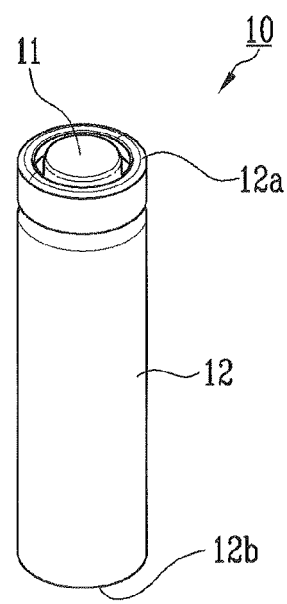
FIG. 2 is an oblique view of a bare cell constructed with the embodiment of the present invention.
Figure 3:
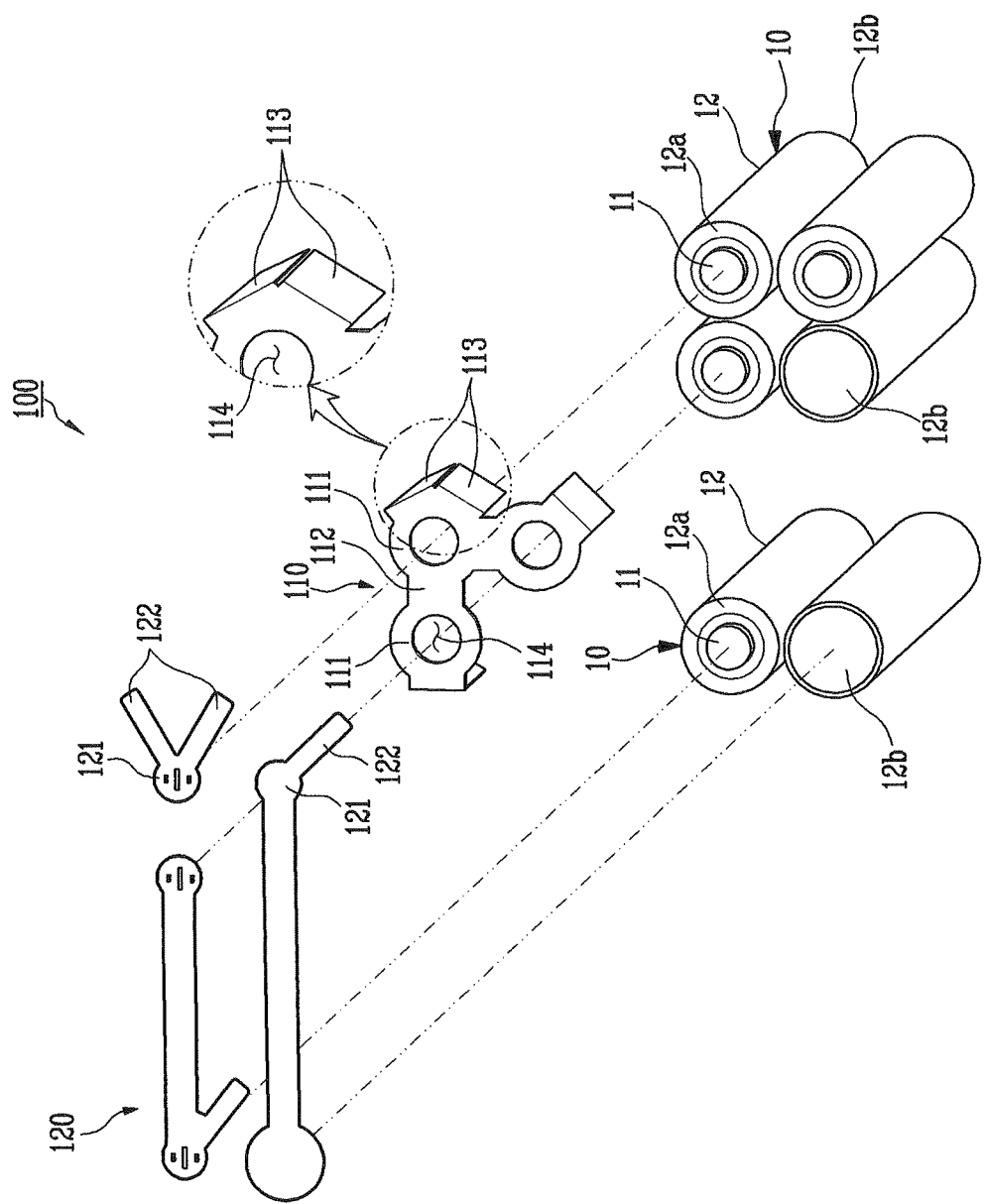
FIG. 3 is an exploded perspective view of FIG. 1.

FIG. 1 is a perspective view of a battery pack according to an embodiment of the present invention. FIG. 2 is a perspective view of a bare cell according to the embodiment of the present invention. FIG. 3 is an exploded perspective view of FIG. 1.

Referring to FIGS. 1 to 3, the battery pack 100 according to this embodiment includes at least two or more bare cells 10 each having a first terminal portion 11; a lead tab 120 provided to the terminal portion 11 of the bare cell 10; and an insulating member 110 interposed between the bare cell 10 and the lead tab 120 and provided with an opening 114 so that the bare cell 10 and the lead tab 120 are electrically connected to each other. The opening 114 may be a through hole penetrating the insulting member 110. The insulating member 110 includes two or more bare cell facing portions 111 respectively corresponding to bare cells 10, an extending portion 112 that connects neighboring bare cell facing portions 111 to each other, and guide portions 113 respectively provided to the bare cell facing portions 111 so as not to be arranged on one straight line. The insulating member 110 may be provided as a single body.

The bare cell 10 may be manufactured by accommodating an electrode assembly and an electrolyte in a battery case 12 having an opened top and sealing the top with a cap assembly 11. In this instance, the battery case 12 may be a cylindrical can 12. The cylindrical can 12 may be provided with a top portion 12a so as to prevent the cap assembly 11 provided to the cylindrical can 12 from being separated from the cylindrical can 12. Here, the top portion 12a is bent to the inside of the cylindrical can 12 by crimping the cylindrical can 12 using a jig. In the bare cell 10, the opposite portion to the top portion 12a at which the cap assembly 11 is provided to the cylindrical can 12 may be a bottom portion 12b of the cylindrical can 12.

The electrode assembly is composed of a positive electrode plate, a negative electrode plate and a separator interposed therebetween, and these electrode plates may generate electrochemical energy through a reaction between the electrodes plates and the electrolyte. The positive electrode plate may be connected to the cap assembly 11, and the negative electrode plate may be connected to the bottom portions 12b of the cylindrical can 12, so that the electrode plates may be electrically connected to the exterior of the cylindrical can 12. Thus, the electrode assembly 11 may be a positive electrode terminal that is the first terminal portion 11. Particularly, the bottom portion 12b may serve as a negative electrode terminal that is a second terminal portion, and a gasket or the like may be interposed between the cap assembly 11 and cylindrical can 12 having opposite polarities to each other so as to prevent a short circuit and the like.

The lead tab 120 may be provided to the positive electrode terminal 11 or negative electrode terminal of the bare cell 10 so as to electrically connect the bare cell 10 to a plurality of bare cells 10. For example, the lead tab 120 may be made of an electrical conductor such as nickel or copper. The lead tab 120 may be properly modified according to the number and connection shape of bare cells 10 connected therethrough. However, the present invention is not limited thereto.

The lead tab 120 may include a joint portion 121 electrically connected to the bare cell 10, and a connection portion 122 extended in a line shape from the joint portion 121. The joint portion 121 may be thermally bonded to the cap assembly 11 or bottom portion 12b of the bare cell 10 through welding or the like so as to be a path of current. The connection portion 122 may be extended in a line shape from the joint portion 121 so as to electrically connect between bare cells 10 spaced apart from each other.

The insulating member 110 may be provided to prevent a short circuit between the bare cell 10 and the lead tab 120. The insulating member 110 may further include an adhesive layer provided between the insulating member 110 and the bare cell 10. The insulating member 110 may be made of an electrically insulative material, and may include, for example, a double-faced tape or Nomex tape. The adhesive layer may be further provided with the insulating member 110, so that the insulating member 110 may be firmly fixed on the bare cell 10. Since it is easy to fix the position of the insulating member 110 on the bare cell 10, it is possible to perform welding between the bare cell 10 and the lead tab 120, which is a subsequent process.

Generally, the battery pack 100 is used as a power source of an electronic device, and the electronic device requires various amounts of power according to the specification thereof. Such an amount of power may be achieved by connecting the plurality of bare cells 10 that constitute the battery pack 100 in series or parallel to one another.

The lead tab 120 may be formed of an electrical conductor In a case where the lead tab 120 is thermally bonded to the cap plate 11, the lead tab 120 may easily come in physical contact with even the top portion 12a of the cylindrical can 12 adjacent to the cap plate 11, and therefore, a risk such as a short circuit may occur. In order to solve this problem, the insulating member 110 may be interposed between the lead tab 120 connected to the cap plate 11 and the bare cell 10, particularly between the connection portion 122 of the lead tab 120 and the top portion 12a of the cylindrical can 12. The insulating member 110 may further include the opening 114. The opening 114 may be provided to geometrically correspond to the joint portion 121 of the lead tab 120 for the purpose of the thermal bonding between the lead tab 120 and the bare cell.

When the insulating member 110 is provided between the lead tab 120 and the bare cell 10, a failure may occur because it is not easy to align the position of the insulating member 110. In a case where the top portion 12a of the cylindrical can 12 is misaligned with the insulating member 110 due to the deviation of the position of the insulating member 110, the top portion 12a of the cylindrical can 12 comes in contact with the lead tab 120, and therefore, a short circuit between the top portion 12a of the cylindrical can 12 and the lead tab 120 may occur.

In this embodiment, the insulating member 110 may be formed in one body. The insulating member 110 may be collectively provided to a plurality of neighboring bare cells 10, thereby improving process efficiency. Since the accuracy of the position of the insulating member 110 provided on the bare cell 10 is improved, the insulating member 110 is advantageous in terms of stability.

Figure 4:
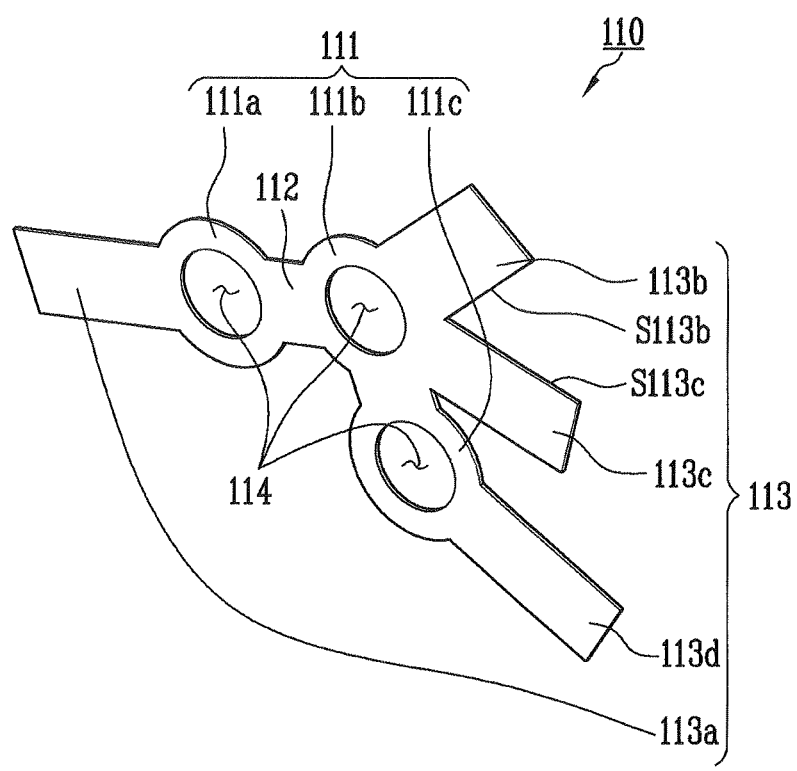
FIG. 4 is an oblique view of an insulating member constructed with the embodiment of the present invention.

FIG. 3 is an exploded perspective view of FIG. 1. FIG. 4 is a perspective view of an insulating member according to an embodiment of the present invention.

Referring to FIGS. 3 and 4, the insulating member 110 is interposed between the bare cell 10 and the lead tab 120 and provided with an opening 114 so that the bare cell 10 and the lead tab 120 may be electrically connected to each other via the opening 114. The insulating member 110 may include two or more bare cell facing portions 111 respectively corresponding to bare cells 10, an extending portion 112 that connects neighboring bare cell facing portions 111 to each other, and guide portions 113 respectively provided to the bare cell facing portions 111 so as not to be arranged on one straight line.

The bare cell facing portion 111 is a portion that comes in direct contact with the bare cell 10. In a case where the bare cell 10 has a cylindrical shape, the bare cell facing portion 111 may be formed in a circular shape geometrically corresponding to the section of the bare cell 10. As described above, the first terminal portion 11 of the bare cell 10 may be a cap assembly 11, and the opening 114 may be provided to the bare cell facing portion 111 so as to geometrically correspond to the cap assembly 11. In this instance, the opening 114 may be provided at a central portion of the bare cell facing portion 111.

The extending portion 112 may be provided to connect neighboring bare cell facing portions 211 to each other. Generally, the bare cell may have a round side portion so as to maximize capacity efficiency. Therefore, the bare cell facing portion 111 may be formed, for example, in an elliptic or circular shape, corresponding to the section of the bare cell 10. In case where neighboring bare cell facing portions 111 formed in the elliptic or circular shape are arranged in point contact with each other, the bonding force between the neighboring bare cell facing portions 111 may be reduced. Therefore, the extending portion 112 is provided in a space between the bare cell facing portions 111, so that it is possible to improve the bonding force between the neighboring bare cell facing portions 111. In this embodiment, the insulating member 110 may be formed in one body by the extending portion 112.

The bare cell facing portion 111 may further include a guide portion 113 formed at portions of the bare cell facing portion 111 at which the extending portion 112 is not provided. The guide portion 113 is extended from an outermost circumference of the bare cell facing portion 111, and may be bent to come in contact with a side surface of the bare cell 10. The guide portion 113 may be formed in a shape corresponding to the connection portion 122 of the lead tab 120 so as to be interposed between the connection portion 122 and the bare cell 10.

In this embodiment, as shown in FIG. 4, the bare cell facing portion 111 may include first to third bare cell facing portions 111a, 111b and 111c in sequence. The first to third bare cell facing portions 111a, 111b and 111c may be extended to one another so as to have a '┐' shape. The first to third bare cell facing portions 111a, 111b and 111c may be disposed at three corners of a right-angled triangle. In this instance, first and third guide portions 113a and 113d may be provided to the first and third bare cell facing portions 111a and 111c, respectively, and one or more second guide portions 113b and 113c may be provided to the second bare cell portion 111b. The first to third guide portions 113a, 113b, 113c and 113d may be provided so as not to be arranged on a straight line.

The insulating member 110 having the first to third bare cell facing portions 111a, 111b and 111c formed in the '┐' shape enables the bare cells 10 to be attached thereto using the adhesive layer provided to the insulating member 110, and thus the bare cells 10 may be easily aligned according to the designed shape of the insulating member 110. Generally, in the case of the bare cell 10 having a cylindrical external appearance, it is not easy to maintain the alignment of the bare cells 10 due to the limitation of the external appearance. Therefore, a failure of electrical contact may occur because the lead tab 120 is not bonded at a predetermined position on the bare cell 10. The insulating member 110 according to this embodiment allows the bare cells 10 to be easily aligned by the shape of the insulating member 110 and the adhesive layer provided to the insulating member 110, thereby improving production efficiency. In this embodiment, the insulating member 110 is formed in the '┐' shape. However, the shape of the insulating member 110 may be variously modified according the arrangement shape of the bare cells 10, or the like.

The first to third guide portions 113a, 113b, 113c and 113d are bent so as not to be overlapped with one another, and may be bent perpendicular to the respective first to third bare cell facing portions 111a, 111b and 111c. In a case where the number of the second guide portions 113b and 113c is two or more, the two or more second guide portions 113b and 113c bent perpendicular to the second bare cell facing portion 111b may be provided so that their corner portions face each other. That is, in a case where the two second guide portions 113b and 113c are provided to the second bare cell facing portion 111b, the two second guide portions 113b and 113c respectively bent to come in contact with side surfaces of the bare cell 10 may be provided so as not to be overlapped with each other. In this instance, the two second guide portions 113b and 113c are provided so that their side portions S113b and S113c come in contact with each other, and thus it is advantageous for the alignment and external appearance of the bare cells 10 provided to the insulating member 110.

Hereinafter, other embodiments of the present invention will be described with reference to FIGS. 5 to 7B. In these embodiments, components are identical to those of the embodiment described in FIG. 4 except the following descriptions, and therefore, their descriptions will be omitted.

Figure 5:
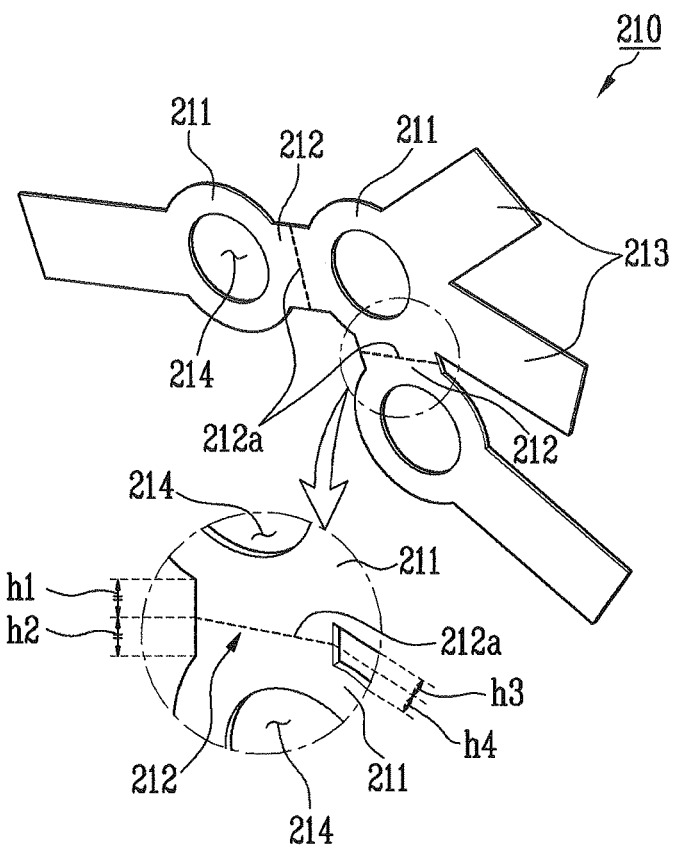
FIG. 5 is an oblique view of an insulating member constructed with another embodiment of the present invention.

FIG. 5 is a perspective view of an insulating member constructed with another embodiment of the present invention.

Referring to FIG. 5, the insulating member 210 according to this embodiment is interposed between a bare cell and a lead tab, and may be provided with an opening 214 so that the bare cell and the lead tab are electrically connected to each other. The insulating member 210 may include two or more bare cell facing portions 211 respectively corresponding to bare cells, an extending portion 212 that connects neighboring bare cell facing portions 211 to each other, and guide portions 213 respectively provided to the bare cell facing portions 211 so as not to be arranged on one straight line.

The extending portion 212 may further include a first perforated line 212a provided between neighboring bare cells. The first perforated line 212a may be provided between neighboring bare cell facing portions 211. The first perforated line 212a may be provided at the center of the extending portion 212. The arrangement shape of the bare cells may be may be modified by a subsequent change in design of the insulating member 210 formed in one body. In this instance, the first perforated line 212a is provided to the extending portion 212, so that it is possible to cut off the bare cell facing portion 211. In one embodiment, each extending portion 212 may have a perforated line 212a. Thus, it is possible to reduce production cost taken in reproduction of the insulating member 210. Further, in a battery pack provided with the insulating member 210, it is possible to easily exchange any one of bare cells that constitute the battery pack. In a case where the first perforated line 212a is biased to one side of the extending portion 212, a short circuit between the bare cell and the lead tab may occur due to the contact of a top portion of the bare cell with the lead tab. Preferably, the first perforated line 212a is approximately provided at the center of the extending portion 212, i.e., h1=h2 and h3=h4.

Figure 6:
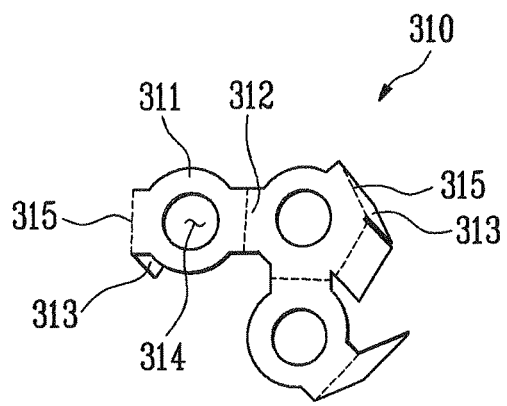
FIG. 6 is an oblique view of an insulating member constructed with still another embodiment of the present invention.

FIG. 6 is a perspective view of an insulating member according to still another embodiment of the present invention.

Referring to FIG. 6, the insulating member 310 interposed between a bare cell and a lead tab may include two or more bare cell facing portions 311, an extending portion 312 that connects neighboring bare cell facing portions 311 to each other, and an opening 314 provided to the bare cell facing portion 311. The insulating member 310 may include guide portions 313 respectively provided to the bare cell facing portions 311 corresponding to bare cells so as not to be arranged on one straight line. The guide portion 313 is extended from an outermost circumference of the bare cell facing portion 311, and may be provided to corresponding to a connection portion of the lead tab.

The guide portion 313 may be bent perpendicular to the bare cell facing portion 311 so as to come in contact with a side surface of the bare cell. A second perforated line 315 may be provided at a portion at which the guide portion 313 is bent. The guide portion 313 is provided to geometrically correspond to the connection portion of the lead tab, and may be provided to prevent a short circuit between the bare cell and the lead tab. In a case where the bending of the guide portion 313 is not performed at a correct position, the short circuit between the bare cell and the lead tab may occur due to the contact of the lead tab with the bare cell. The second perforated line 315 is provided to the guide portion 313, so that the bending of the guide portion 313 may be precisely and rapidly performed, thereby improving process efficiency.

Figure 7A:
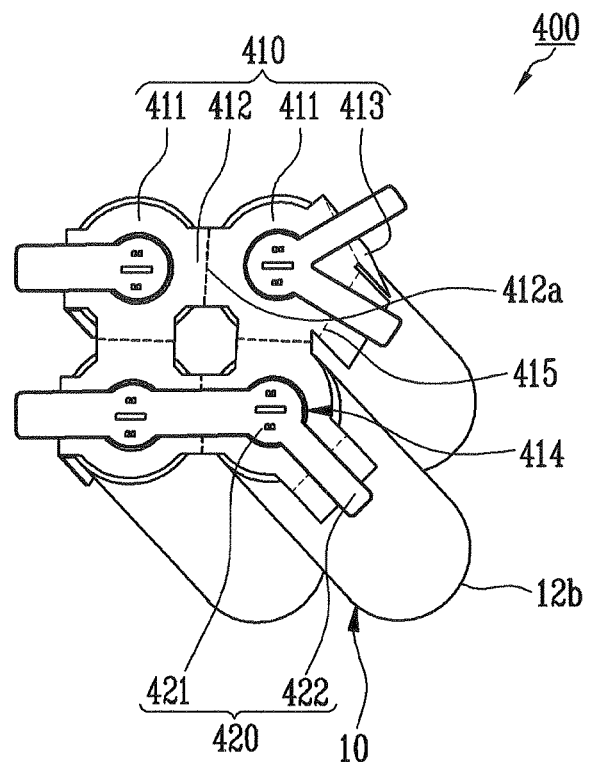
FIG. 7A is an oblique view of a battery pack constructed with yet another embodiment of the present invention.
Figure 7B:
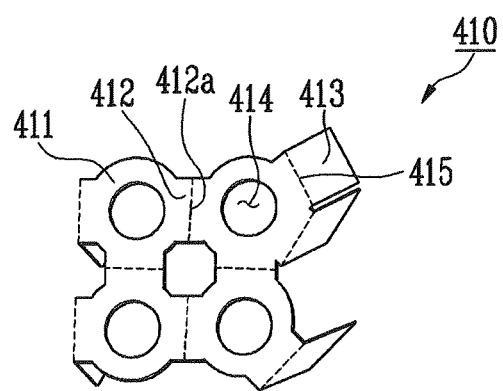
FIG. 7B is an oblique view of an insulating member constructed with yet another embodiment of the present invention.

FIG. 7A is perspective view of a battery pack according to an embodiment of the present invention. FIG. 7B is perspective view of an insulating member according to the embodiment of the present invention.

Referring to FIGS. 7A and 7B, in the battery pack 400 according to this embodiment, four bare cells 10 are connected in series or parallel by a plurality of lead tabs 420, and the bare cell 10 and the lead tab 420 are insulated from each other by an insulating member 410 formed in one body, so that it is possible to prevent a risk such as a short circuit. The insulating member 410 may include a bare cell facing portion 411 having an opening 414, an extending portion 412 that connects neighboring bare cell facing portions 411 to each other, and a guide portion 413 extended from an outermost circumference of the bare cell facing portion 411 and provided to correspond to a connection portion 422 of the lead tab 420. First and second perforated lines 412a and 415 are provided between the extending portion 412 and the bare cell facing portion 411 and between the extending portion 412 and the guide portion 413, respectively. Thus, the bending of the insulating member may be easily performed.

The insulating member 410 according to this embodiment may simultaneously insulate the four bare cells 10 from one another, so that it is possible to reduce production time of the battery pack 400. Further, the bare cells 10 are easily aligned by the insulating member 410, so that it is possible to prevent a failure that may occur in a process of the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
at least two or more bare cells each having a first terminal portion;
a lead tab provided to the first terminal portion of the bare cell; and
an electrically insulating member interposed between the bare cells and the lead tab and provided with an opening so that each bare cell and the lead tab are electrically connected to each other,
wherein the insulating member comprises two or more bare cell facing portions respectively geometrically corresponding to the bare cells, an extending portion that connects neighboring bare cell facing portions to each other, and guide portions respectively extending from the bare cell facing portions so as not to be arranged in one straight line, and the extending portion comprises a first sub extending portion extending in a first direction and a second sub extending portion extending in a second direction which is perpendicular to the first direction,
wherein each of the bare cells has a cylindrical shape, and each of the bare cell facing portions is formed in a circular shape,
wherein the bare cell facing portions comprise first to third bare cell facing portions in sequence, and the second bare cell facing portion is connected to the first bare cell facing portion by the first sub extending portion and is connected to the third bare cell facing portion by the second sub extending portion,
wherein the lead tab comprises a joint portion electrically connected to the bare cell, and a connection portion extended in a line shape from the joint portion,
wherein the guide portions are respectively formed in a shape geometrically corresponding to the connection portion of the lead tab so as to be interposed between the connection portion and the bare cell,
wherein the extending portion comprises a first perforated line provided between neighboring bare cells, and
wherein the perforated line includes multiple through holes.

2. The battery pack according to claim 1, wherein the insulating member is formed in a single body.

3. The battery pack according to claim 1, wherein the first perforated line is provided at the center of the extending portion.

4. The battery pack according to claim 1, wherein the opening is provided at a central portion of the bare cell facing portion.

5. The battery pack according to claim 1, wherein each of the guide portions is provided to be bent to a side surface of the bare cell.

6. The battery pack according to claim 5, wherein the guide portions are bent so as not to be overlapped with each other and are bent perpendicular to the bare cell facing portion.

7. The battery pack according to claim 5, wherein a second perforated line is provided at a portion at which each of the guide portions is bent.

8. The battery pack according to claim 1, wherein the first terminal portion of the bare cell comprises a cap assembly, and the opening corresponding to the cap assembly is provided to the bare cell facing portion.

9. The battery pack according to claim 1, wherein first and third guide portions are provided to the first and third bare cell portions, respectively, and the second bare cell facing portion comprises one or more second guide portions provided so as not to be overlapped with each other.

10. The battery pack according to claim 1, wherein the number of the second guide portions is two or more, the second guide portions are bent perpendicular to the second bare cell facing portion, and the bent second guide portions are provided so that their corner portions come in contact with each other.

11. The battery pack according to claim 1, wherein the insulating member further comprises an adhesive layer provided between the insulating member and the bare cells.

* * * * *